UNITED STATES PATENT OFFICE.

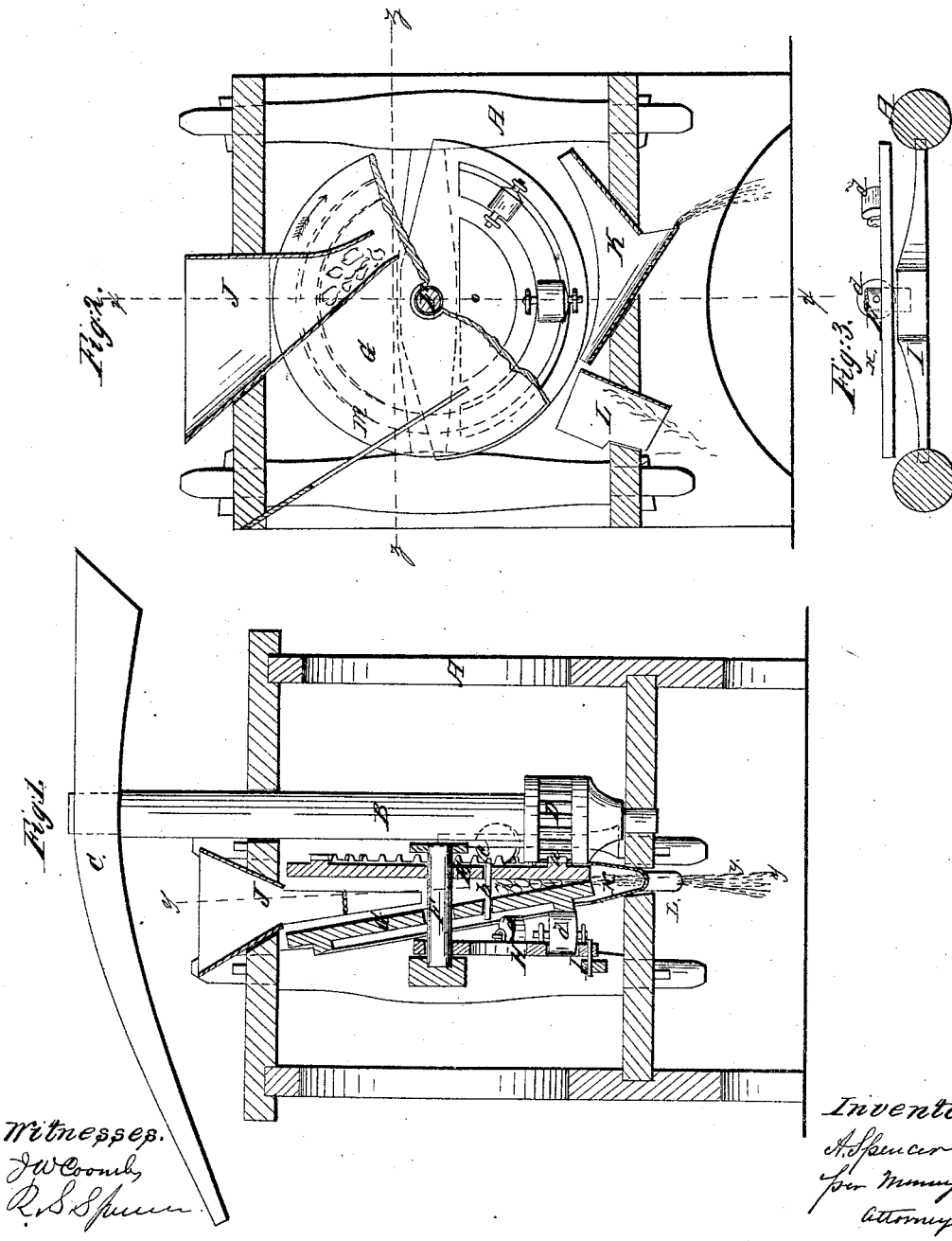

ABRAHAM SPENCER, OF GRAMPIAN HILLS, PENNSYLVANIA.

IMPROVEMENT IN CIDER-MILLS.

Specification forming part of Letters Patent No. 35,787, dated July 1, 1862.

*To all whom it may concern:*

Be it known that I, ABRAHAM SPENCER, of Grampian Hills, in the county of Clearfield and State of Pennsylvania, have invented a new and Improved Cider-Mill; and I do hereby declare that the following is a full, clear, and exact description of the same, reference being had to the annexed drawings, making a part of this specification, in which—

Figure 1 is a vertical section of my invention, taken in the line $x\,x$, Fig. 2; Fig. 2, a vertical section of the same, taken in the line $y\,y$, Fig. 1; Fig. 3, a horizontal section of a portion of the same, taken in the line $z\,z$, Fig. 2.

Similar letters of reference indicate corresponding parts in the several figures.

This invention relates to an improved cider-mill of that class which crush and compress the juice from the apples simultaneously.

The object of the invention is to obtain a simple and efficient device for the intended purpose, and one in which the pomace will be separated from the juice and discharged from the machine at a separate point.

To enable those skilled in the art to fully understand and construct my invention, I will proceed to describe it.

A represents a framing, which may be constructed in any proper way to support the working parts of the machine. B is a vertical shaft, which is placed in the framing A, provided with a sweep, C, at its upper end, and with a pinion, D, at its lower end, which pinion gears into a toothed rim, $a$, at the outer side of a circular plate, E, which is fitted loosely on a shaft, F, in the framing.

On the shaft F there is also placed loosely a circular-plate, G, which is of the same size as plate E. The two plates E G have an oblique position relatively with each other, as shown clearly in Fig. 1, and the two plates are connected by a pin, $b$. The plate E bears against a roller, $c$, at its outer side, and the plate G bears at its lower part against friction-rollers $d$, which are fitted in a frame, H, the lower part of which is connected with or bears against a stiff spring, I. (See Figs. 1 and 3.) The lower edges of the plates E G are in contact, and just above their top edges a hopper, J, is placed, said hopper having a curved spout, which extends down between the plates E G and toward their front edges, as shown in Fig. 2.

Just below the plates E G there is placed a spout, K, and directly back of this spout there is placed a spout, L. Both spouts are shown in Fig. 2. Between the two plates there is placed a strip, M, which serves as a scraper. This scraper is placed just above the spout L.

The operation is as follows: The shaft B is rotated by any convenient power, and the plates E G have a rotary motion communicated to them through the medium of the gearing D $a$. The apples are directed by the lower end of the hopper down between the front parts of the plates E G, and the apples are crushed as they pass around between the lower parts of the plates, and the juice is also expressed from them, the juice falling into the spout K, by which it is conveyed into any proper receptacle. The scraper M carries the pomace to be discharged into the spout L. The spring I keeps the plate G to its work, and at the same time it allows the plate to give or yield a little when necessary.

The device is extremely simple and efficient, and may be constructed at a moderate cost—much less than all others that have passed under my observation.

I do not claim, broadly, the employment of two disks, one of them hung obliquely; but,

Having thus described my invention, what I claim as new, and desire to secure by Letters Patent, is—

The combination, in the manner herein shown and described, of the disks E G and shafts F B with the roller $d$, frame H, and spring I, all as set forth.

ABRAHAM SPENCER.

Witnesses:
THOMAS STRONACH,
D. S. MOORE.